US008367265B2

United States Patent
Salvatore et al.

(10) Patent No.: US 8,367,265 B2
(45) Date of Patent: Feb. 5, 2013

(54) UNIFORM GAS DISTRIBUTION THROUGH CHANNELS OF SOFC

(75) Inventors: James A. Salvatore, Sutton, MA (US); Vignesh Rajamani, Wilmington, MA (US); Abhijit Dutta, Shrewsbury, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 471 days.

(21) Appl. No.: 12/638,781

(22) Filed: Dec. 15, 2009

(65) Prior Publication Data

US 2010/0151349 A1    Jun. 17, 2010

Related U.S. Application Data

(60) Provisional application No. 61/203,105, filed on Dec. 17, 2008.

(51) Int. Cl.
*H01M 8/10* (2006.01)
(52) U.S. Cl. ......... 429/483; 429/458; 429/512; 429/478
(58) Field of Classification Search .................. 429/483, 429/458, 512, 479
See application file for complete search history.

(56) References Cited

U.S. PATENT DOCUMENTS

| | | | |
|---|---|---|---|
| 5,376,472 A | 12/1994 | Hartvigsen et al. | |
| 2003/0151156 A1 | 8/2003 | Crumm et al. | |
| 2004/0191594 A1* | 9/2004 | Kearl | 429/19 |
| 2005/0026030 A1 | 2/2005 | Mardilovich et al. | |
| 2005/0084725 A1 | 4/2005 | Arthur et al. | |
| 2005/0214613 A1 | 9/2005 | Sarkar et al. | |
| 2007/0178366 A1 | 8/2007 | Mahoney et al. | |
| 2007/0224481 A1 | 9/2007 | Suzuki et al. | |
| 2008/0003481 A1 | 1/2008 | Ecer | |

OTHER PUBLICATIONS

Notification of Transmittal of the International Search Report and the Written Opinion of the International Searching Authority, or the Declaration, International Application No. PCT/US2009/068084, date of mailing, Jul. 30, 2010.
Transmittal of International Preliminary Report on Patentability and Written Opinion, International Application No. PCT/US2009/068084 mailed on Jun. 30, 2011.
Supplementary European Search Report, Oct. 2, 2012, 1 page.

* cited by examiner

*Primary Examiner* — Jane Rhee
(74) *Attorney, Agent, or Firm* — Robert T. Conway; Abel Law Group, LLP

(57) ABSTRACT

A solid oxide fuel cell includes an anode layer, an electrolyte layer over the anode layer, and a cathode layer over the electrolyte layer. At least one of the anode layer and the cathode layer defines a gas manifold. The gas manifold includes a gas inlet, defined by an edge of the anode layer or cathode layer, a gas outlet, defined by the same or a different edge of the anode layer or cathode layer, and a plurality of gas flow channels in fluid communication with the gas inlet and gas outlet. The gas flow channels can have diameters that conduct flow of gas from the gas inlet at substantially equal flow rates among the gas flow channels.

22 Claims, 8 Drawing Sheets

UNIFORM GAS DISTRIBUTION THROUGH CHANNELS OF SOFC

RELATED APPLICATION

This application claims the benefit of U.S. Provisional Application No. 61/203,105, filed on Dec. 17, 2008.

The entire teachings of the above application are incorporated herein by reference.

BACKGROUND OF THE INVENTION

A fuel cell is a device that generates electricity by a chemical reaction. Among various fuel cells, solid oxide fuel cells use a hard, ceramic compound metal (e.g., calcium or zirconium) oxide as an electrolyte. Typically, in solid oxide fuel cells, an oxygen gas, such as $O_2$, is reduced to oxygen ions ($O^2$) at the cathode, and a fuel gas, such as $H_2$ gas, is oxidized with the oxygen ions to form water at the anode. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

The efficiency of a solid oxide fuel cell (SOFC) depends in part on the distribution of oxygen and fuel in the cathode and anode, respectively. Gas delivery is typically provided to the SOFC stack by gas channels formed within the electrodes (cathode and anode). External access to the gas channels is typically provided by a manifold which acts as a conduit to supply fuel and oxygen into the gas channels. Manifolds can be configured as internal or external to the SOFC stack. External manifolds are simpler to fabricate and operate but have disadvantages including cracking of the seals between the manifold and the SOFC stack, causing gas leaks, due to mismatches in coefficient of thermal expansion (CTE) between the materials forming the manifold and the SOFC stack. Internal manifolds are more difficult to fabricate, but have sealing advantages over external manifolds discussed above, and also enable more external surface area of the SOFC stack to be exposed for more efficient heat transfer.

A frequent problem with internal manifolds is lack of uniform distribution of air and fuel flow across the respective electrodes. Due to gas flow dynamics, an internal manifold with equal diameter gas channels through the respective electrode generally delivers an uneven gas flow distribution through the electrode, with more gas flow through the channel closest to the manifold inlet, leading to non-uniform temperature distribution within the electrode, and lower efficiency of the SOFC stack.

Therefore, a need exists for an internal manifold design that overcomes or minimizes the above-mentioned problems.

SUMMARY OF THE INVENTION

The invention generally is directed to solid oxide fuel cells that include gas manifolds containing gas flow channels with diameters that conduct a flow of gas from the gas inlet at substantially equal flow rates among the gas flow channels.

In one embodiment, the invention is a solid oxide fuel cell. The solid oxide fuel cell includes an anode layer, an electrolyte layer over the anode layer, and a cathode layer over the electrolyte layer. At least one of the anode layer and the cathode layer defines a gas manifold. The gas manifold includes a gas inlet defined by an edge of the anode layer or cathode layer, and a gas outlet defined by the same or a different edge of the anode layer or cathode layer. The gas manifold further includes a plurality of gas flow channels in fluid communication with the gas inlet and gas outlet.

In one embodiment, the gas flow channels have diameters that conduct flow of gas from the gas inlet at substantially equal flow rates among the gas flow channels. In another embodiment, an inlet channel is defined by the anode layer or the cathode layer, the inlet channel providing fluid communication between the gas flow channels and the gas inlet. In yet another embodiment, an outlet channel is defined by the anode layer or the cathode layer, the outlet channel providing fluid communication between the gas flow channels and the gas outlet. In one embodiment, the gas flow channels are essentially parallel. In another embodiment, the fuel cell includes at least two gas inlets, and in yet another embodiment, the fuel cell includes at least two gas outlets. In one specific embodiment, the fuel cell includes two gas outlets at opposite ends of the outlet channel. In another specific embodiment, a major axis of the inlet channel is essentially normal to major axes of the gas flow channels. In yet another specific embodiment, a major axis of the outlet channel is essentially normal to major axes of the gas flow channels. In one embodiment, the gas inlet is located at one end of the inlet channel. In another embodiment, the gas inlet is centrally located along the inlet channel. In yet another embodiment, the gas flow channels intersect between the inlet channel and the outlet channel. In a specific embodiment, at least a portion of the gas flow channels intersect at a substantially normal angle.

In another embodiment, the invention is directed to a method of forming a solid oxide fuel cell. The method includes forming an anode or green cathode precursor, and forming channels in the green anode or cathode precursor layer, the channels defining a gas inlet, a gas outlet and a plurality of gas flow channels in fluid communication with the gas inlet and gas outlet. The method also includes combining the anode or cathode precursor layer with an electrolyte material, whereby the channels are in fluid communication with the electrolyte material, and heating the combined anode and cathode precursor layers and electrolyte materials to form a solid oxide fuel cell. In one embodiment, the method further includes the step of combining at least two solid oxide fuel cells to form a stack of solid oxide fuel cells. In another embodiment, the channels are formed by placing a fugitive material at the anode or cathode precursor layer. In one embodiment, the fugitive material is removed during heating of the combined anode or cathode precursor layer and electrolyte material. In another embodiment, the fugitive material is removed by dissolving the fugitive material. In yet another embodiment, the fugitive material is removed by physical removal of the fugitive material. In another embodiment, the channels are formed by laser etching the anode or cathode precursor layer. In yet another embodiment, the channels are formed by cutting, punching, or embossing portions of the anode or cathode precursor layer. The combined anode and cathode precursor layers and electrolyte layer can then be heated by hot pressing.

Advantages of a gas manifold of this invention include a substantially uniform flow of gas among gas flow channels in an electrode, thus providing a more uniform temperature distribution across the electrode and a more homogeneous distribution of reactants across an electrode surface, due to a constant mass flow distribution through the gas channels, which can raise the operational efficiency of the SOFC stack.

The present invention can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

DETAILED DESCRIPTION OF THE INVENTION

Figure 1:
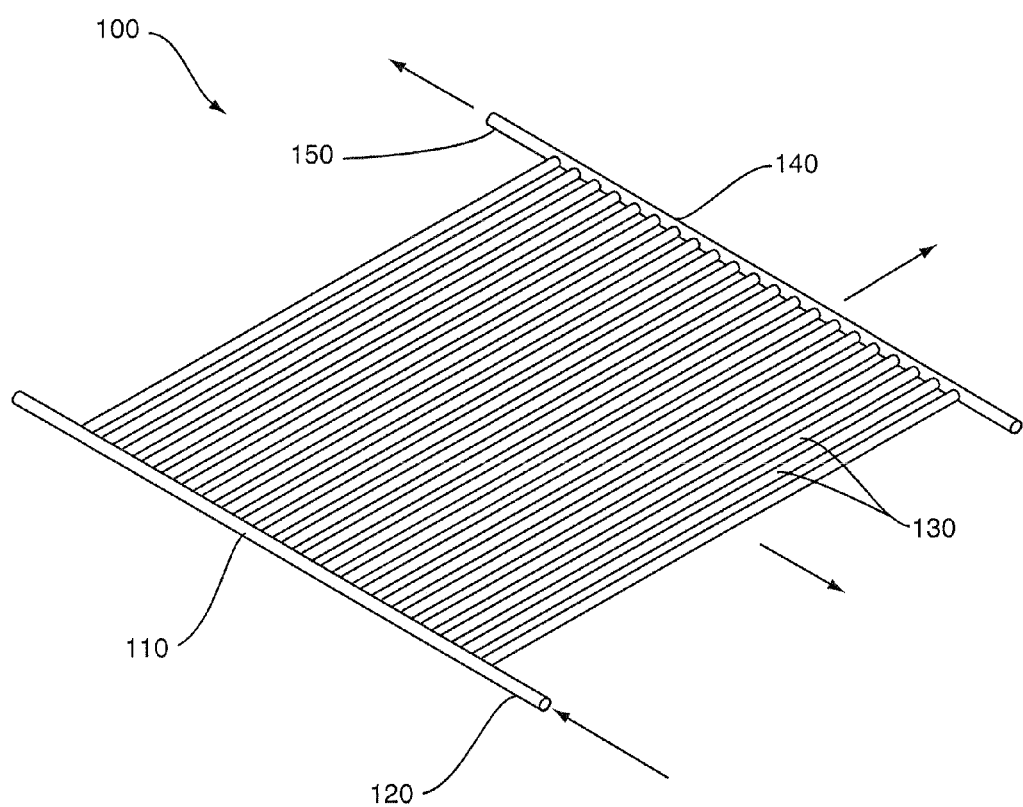
FIG. 1 is a schematic illustration of an internal manifold with one gas inlet at one end of an inlet channel and one gas outlet located at the opposite end of an outlet channel.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. The teachings of all patents, published applications and references cited herein are incorporated by reference in their entirety In one embodiment, the invention is a solid oxide fuel cell. The solid oxide fuel cell includes an anode layer, an electrolyte layer over the anode layer, and a cathode layer over the electrolyte layer. At least one of the anode layer and the cathode layer define a gas manifold, illustrated in FIG. 1. Turning now to FIG. 1, gas manifold 100 includes gas inlet 120 defined by an edge of the anode layer or cathode layer, and gas outlet 150 defined by the same or a different edge of the anode layer or cathode layer (electrode layer), here illustrated in the preferred embodiment with the gas outlet defined by the edge of the electrode layer opposite gas inlet 120. The gas manifold further includes a plurality of gas flow channels 130 in fluid communication with gas inlet 120 and gas outlet 150. In one embodiment, illustrated in FIG. 1, gas manifold 100 includes twenty-one essentially parallel gas flow channels 130. The major axes of inlet channel 110 and outlet channel 140 are essentially normal to major axes of gas flow channels 130. FIG. 1 illustrates internal manifold 100 including an inlet channel 110 of 1.5 mm diameter and about 50 mm length defined by the electrode layer, one circular gas inlet 120 of 1 mm diameter at one end of inlet channel 110, twenty-one gas channels 130 of 0.9 mm diameter and about 50 mm length across the electrode, an outlet channel 140 of 1.5 mm diameter and about 50 mm length, and one circular gas outlet 150 of 1 mm diameter at the end of outlet channel 140 distal from the gas inlet 120 defined by the electrode layer. The inlet and outlet channels provide fluid communication between the gas flow channels and the gas inlet and outlet, respectively.

Figure 2:
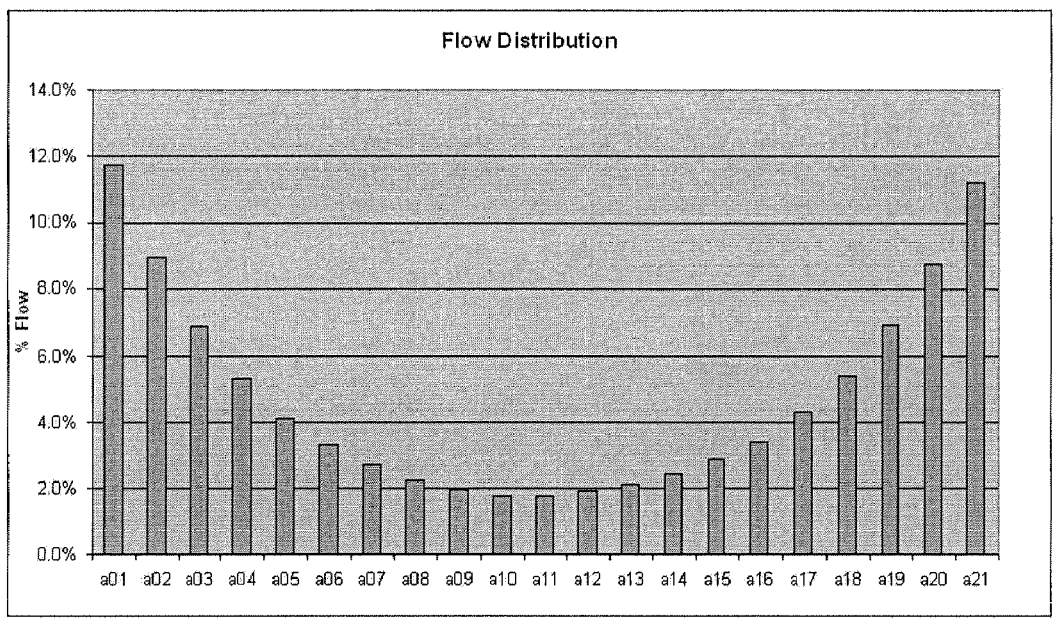
FIG. 2 is a graph of model results of the percent variation in gas flow rate as a function of gas channel number for the internal manifold illustrated in FIG. 1.

The model results of the flow distribution across a porous (porosity about 35%, permeability $2.67 \times 10^{-13}$ $m^2$) electrode for 600 ml/min (milliliters per minute) of hydrogen gas at 800° C., for laminar gas flow (Reynolds number approximately 15 for 1 mm characteristic length) across the twenty-one gas channels are shown in FIG. 2. The model results show high flow rates of gas through the channels closest and furthest away from the gas inlet, with a percent variation in flow rate of almost 12% among gas channels. The model results of flow rate distributions in this embodiment and all other embodiments described below were obtained using the commercially available computational fluid dynamics software FLUENT 6.3.26 (ANSYS, Inc., Canonsburg, Pa.).

Figure 3:
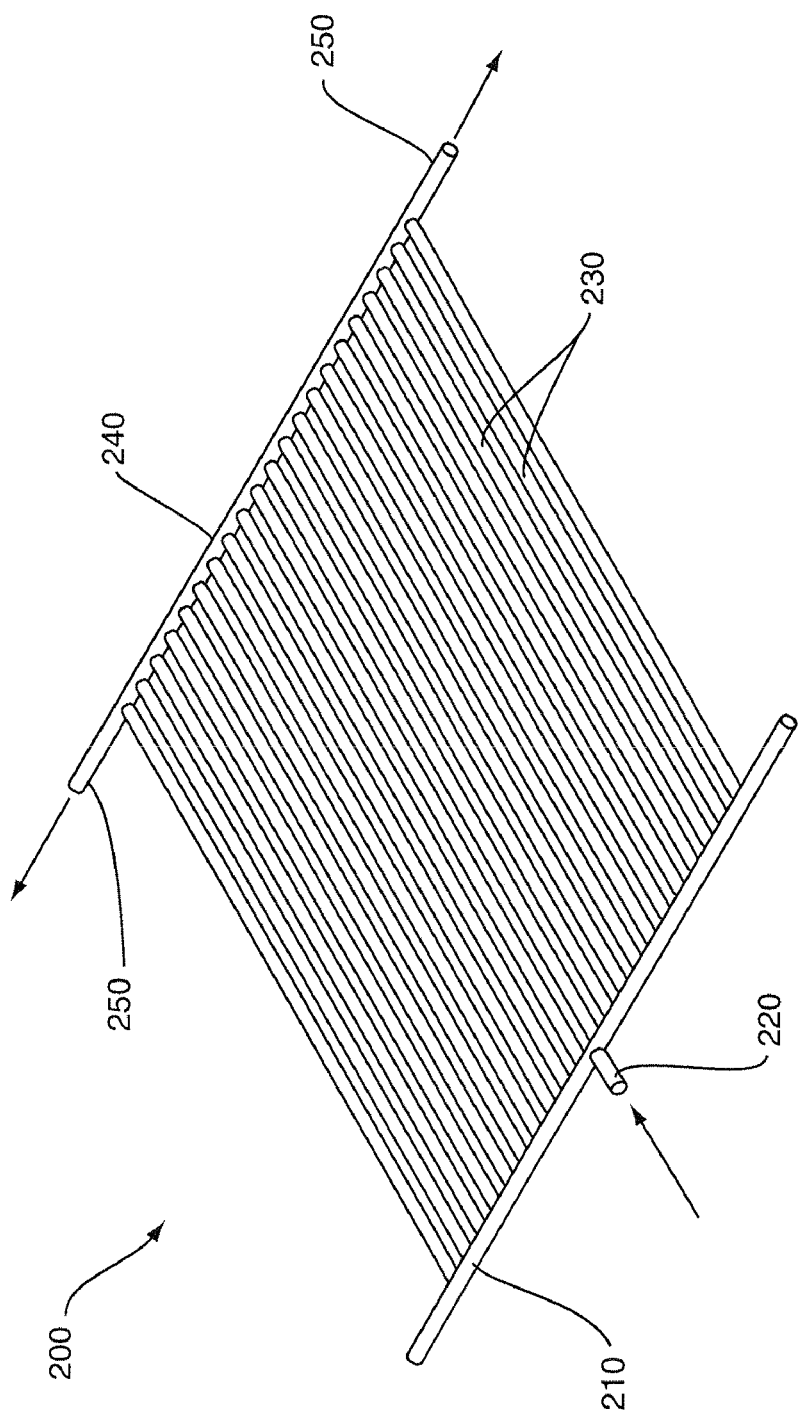
FIG. 3 is a schematic illustration of an internal manifold with one gas inlet centrally located along an inlet channel and two gas outlet located at ends of an outlet channel.
Figure 4:
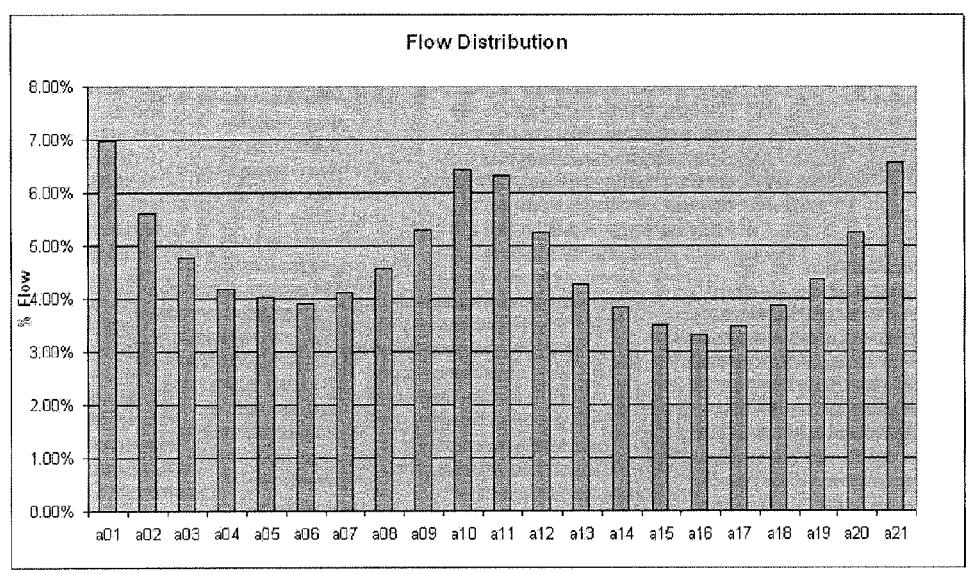
FIG. 4 is a graph of model results of the percent variation in gas flow rate as a function of gas channel number for the internal manifold illustrated in FIG. 3.

In another embodiment, illustrated in FIG. 3, an internal manifold 200 includes an inlet channel 210 of 1.5 mm diameter and about 50 mm length, one circular gas inlet 220 of 1 mm diameter centrally located along inlet channel 210, twenty-one gas channels 230 of 1.0 mm diameter and about 50 mm length across an electrode, an outlet channel 240 of 1.5 mm diameter and about 50 mm length, and two circular gas outlets 250 of 1 mm diameter at the two opposite ends of outlet channel 240. The model results of the flow distribution across a porous (porosity about 35%, permeability $2.67 \times 10^{-13}$ $m^2$) electrode for 600 ml/min of hydrogen gas at 800° C., for laminar gas flow (Reynolds number of about 15 for 1 mm characteristic length) across the twenty-one gas channels are shown in FIG. 4. The model results show high flow rates of gas through the center channels closest to the gas inlet and high flow rates through the channels closest to the gas outlets. The percent relative variation in flow rate is at most about 3%, less than that of the design illustrated in FIG. 1.

Figure 5:
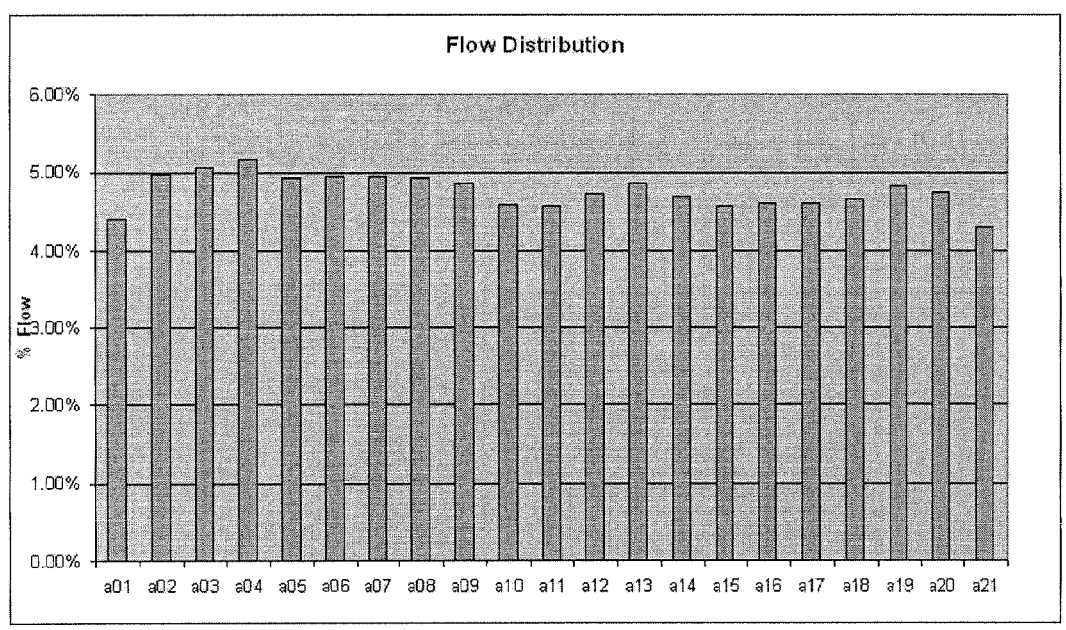
FIG. 5 is a graph of model results of the percent variation in gas flow rate as a function of channel number for the internal manifold illustrated in FIG. 3 with gas channel diameters optimized for substantially equal flow rates among the gas channels.

The diameter of the twenty-one individual gas channels was varied to further reduce the variability of the gas flow rate across the electrode, in order to reduce the temperature variation and the variation in reactant distribution across the electrode to less than that which would occur during operation of the solid oxide fuel cell if the gas flow channels had essentially the same diameters among them. The optimized diameters of the individual gas channels are listed in Table 1 below. The model results of the resulting flow rate variation for the same design shown in FIG. 3, with the individual gas channel diameter listed in Table 1, and flow distribution across a porous (porosity about 35%, permeability $2.67 \times 10^{-13}$ $m^2$) electrode for 600 ml/min of hydrogen gas at 800° C., for laminar gas flow (Reynolds number approximately 15 for 1 mm characteristic length) across the twenty-one gas channels are shown in FIG. 5. The percent relative variation in flow rate is less than about 1%.

TABLE 1

Gas channel diameters for uniform gas flow rate across electrode.

| Channel | Diameter (mm) |
|---|---|
| 1 | 0.796 |
| 2 | 0.859 |
| 3 | 0.900 |
| 4 | 0.927 |
| 5 | 0.935 |
| 6 | 0.941 |
| 7 | 0.930 |
| 8 | 0.908 |
| 9 | 0.875 |
| 10 | 0.820 |
| 11 | 0.826 |
| 12 | 0.876 |
| 13 | 0.923 |
| 14 | 0.944 |
| 15 | 0.959 |
| 16 | 0.968 |
| 17 | 0.960 |
| 18 | 0.943 |
| 19 | 0.919 |
| 20 | 0.877 |
| 21 | 0.814 |

Figure 6:
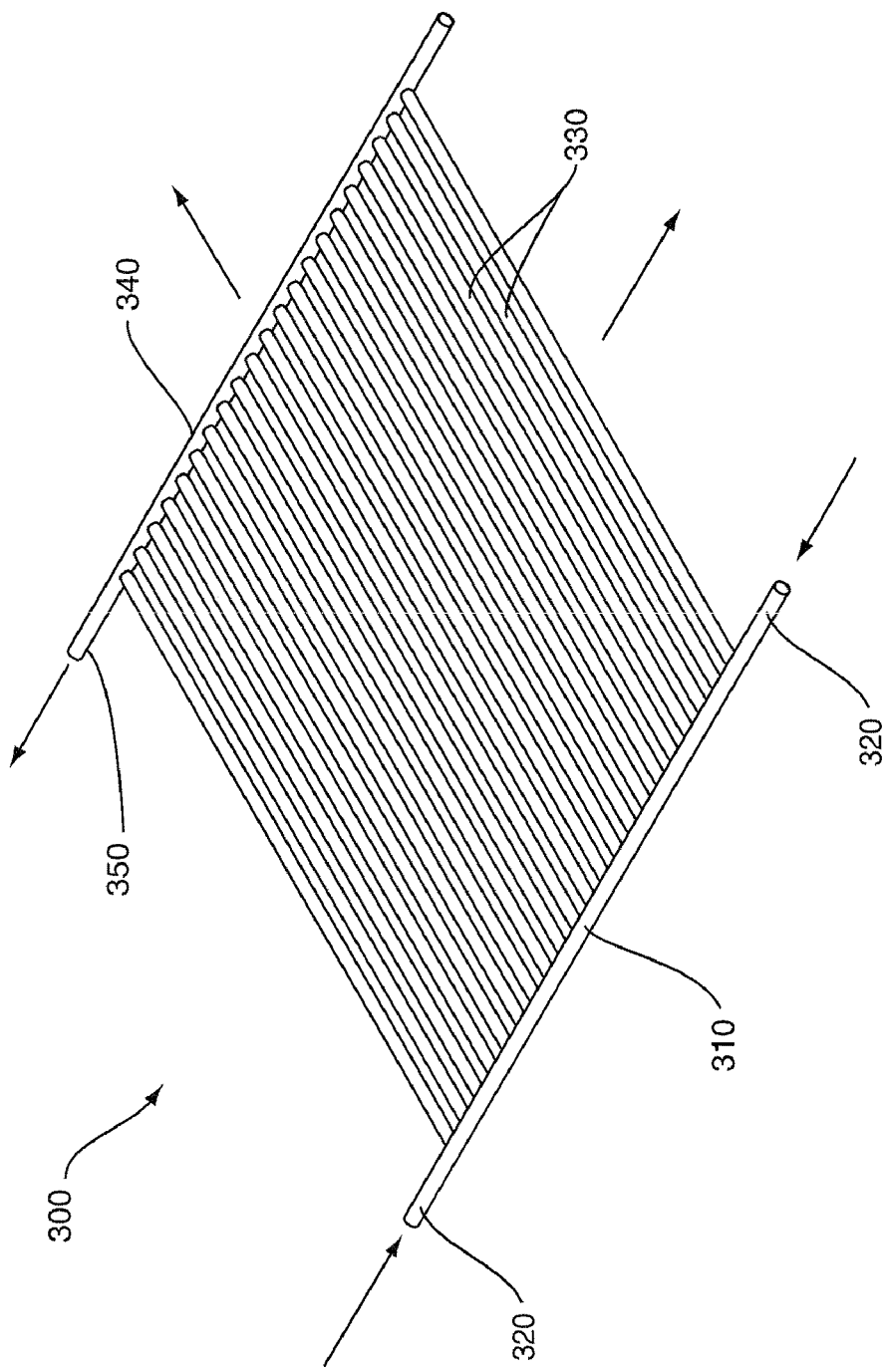
FIG. 6 is a schematic illustration of an internal manifold with two gas inlets and one gas outlet located at an end of an outlet channel.

In yet another embodiment, illustrated in FIG. 6, the gas manifold includes two gas inlets. Turning now to FIG. 6, gas manifold 300 includes two gas inlets 320 defined by two opposing edges of the anode layer or cathode layer, and gas outlet 350 defined by the same or a different edge of the anode layer or cathode layer (electrode layer), here illustrated in the preferred embodiment with the gas outlet defined by the edge of the electrode layer opposite gas inlets 320. The gas manifold further includes a plurality of gas flow channels 330 in fluid communication with gas inlets 320 and gas outlet 350. In one embodiment, illustrated in FIG. 6, gas manifold 300 includes twenty-one essentially parallel gas flow channels 330. The major axes of inlet channel 310 and outlet channel 340 are essentially normal to major axes of gas flow channels 330. The inlet and outlet channels provide fluid communication between the gas flow channels and the gas inlets and outlets, respectively.

Figure 7:
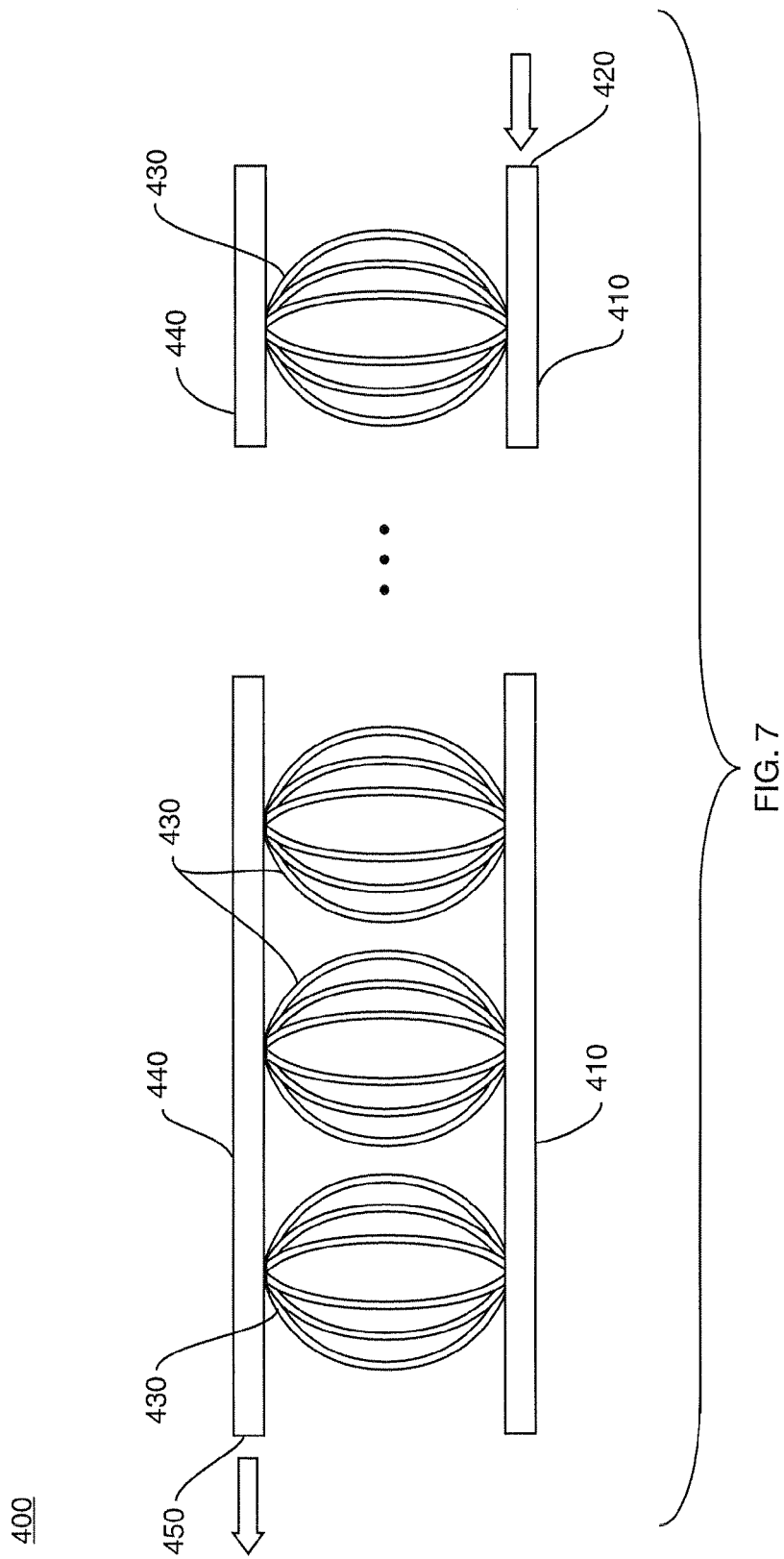
FIG. 7 is a schematic illustration of an internal manifold with intersecting gas flow channels.

In another embodiment, illustrated in FIG. 7, the gas flow channels intersect between the inlet channel and the outlet channel. Turning to FIG. 7, gas manifold 400 includes gas inlet 420 defined by an edge of the anode layer or cathode layer, and gas outlet 450 defined by the same or different edge of the anode layer or cathode layer (electrode layer), here illustrated in the preferred embodiment with the gas outlet defined by the edge of the electrode layer opposite gas inlet 420. The gas manifold includes a plurality of gas flow channels 430 in fluid communication with gas inlet 420 and gas outlet 450. In one embodiment, gas flow channels 430 can intersect at inlet channel 410 and outlet channel 440. In another embodiment, illustrated in FIG. 7, gas flow channels 430 can intersect at a substantially normal angle. The inlet and outlet channels provide fluid communication between the gas flow channels and the gas inlet and outlet, respectively.

Figure 8:
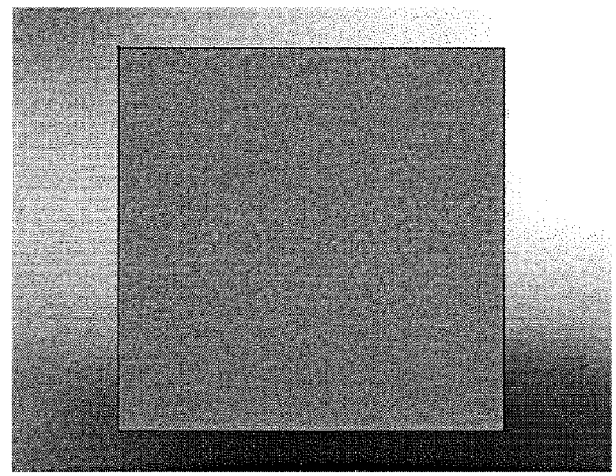
FIG. 8 is an illustration of a solid oxide fuel cell component.
Figure 9:
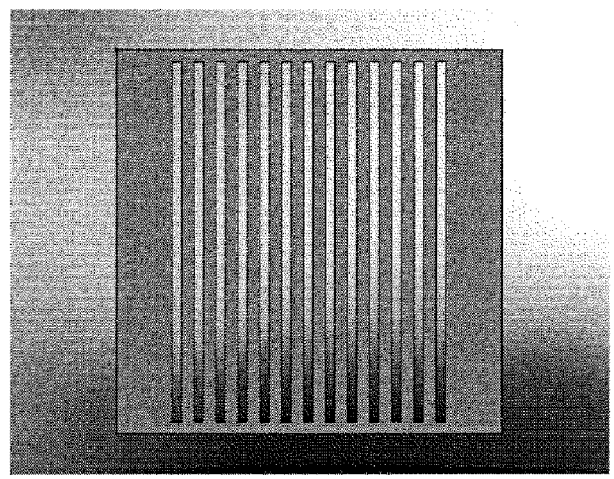
FIG. 9 is an illustration of a solid oxide fuel cell component that includes gas channels.

In another embodiment, the invention is directed to a method of forming a solid oxide fuel cell. The method includes forming an anode or green cathode precursor, and forming channels in the green anode or cathode precursor layer, the channels defining gas inlet, a gas outlet and a plurality of gas flow channels in fluid communication with the gas inlet and gas outlet. Aqueous tape casting slurries were made with both anode and cathode powders. An acrylic based binder system (WB4101, Polymer Innovations, Inc., Vista, Calif.) was used at a level of 10 wt % based on the dry powder. Sheets were tape cast with a thickness of approximately 350 microns. In example embodiments, the tape cast sheets were then cut into two configurations: solid squares with length and width dimensions of 55 mm, shown in FIG. 8, and squares of equivalent external dimensions, but with material removed to create 13 parallel slits each with a width of about 1.3 mm and a length of about 50 mm, as shown in FIG. 9. Alternately, a pattern can be embossed in two solid squares. The sheets can then be stacked vertically with edges aligned to create an internal cavity. In one embodiment, two solid sheets were placed together, followed by five channel cut sheets effectively creating a 13 depressions about 1.3 mm wide by about 1.4 mm deep. A fugitive rod (e.g., 1.3 mm diameter HB pencil lead from Pentel) was then placed in each of the cavities produced within the stacked sheets. Then two solid sheets were placed on top to cover the cavity. The stack of sheets was then laminated together in a heated press at a temperature of about 300° F. and about 3,000 psi of pressure. The subsequently formed part was then heat treated to remove binders and fugitive channel formers and to partially sinter the ceramic powders. An example of a thermal profile is listed in Table 2 below. The portion of the thermal profile from room temperature to 675° C. is used to remove the binders and fugitive channel former, while the remainder of the thermal profile improves the strength of the ceramic material.

TABLE 2

Thermal profile (° C.) for forming gas channels

| Segment | C/min | Hold Time (min) | Segment hr | Segment min | Temp |
|---|---|---|---|---|---|
| Start | | | | | 20 |
| 1 | 1 | | 3 | 50 | 250 |
| 2 | | 180 | 3 | 0 | 250 |
| 3 | 0.5 | | 3 | 20 | 350 |
| 4 | | 0 | 0 | 0 | 350 |
| 5 | 1 | | 5 | 0 | 650 |
| 6 | | 120 | 2 | 0 | 650 |
| 7 | 1 | | 0 | 25 | 675 |
| 8 | | 60 | 1 | 0 | 675 |
| 9 | 5 | | 2 | 25 | 1450 |
| 10 | | 60 | 1 | 0 | 1450 |
| 11 | 15 | | 1 | 33 | 50 |
| 12 | | 0 | 0 | 0 | 50 |

The method also includes combining the anode and cathode precursor layer with an electrolyte material, whereby the channels are in fluid communication with the electrolyte material, and heating the combined anode and cathode precursor layer and electrolyte materials to form a solid oxide fuel cell. In one embodiment, the combined anode and cathode precursor layers and electrolyte material were heated in an air atmosphere at a temperature in the range of between 1200° C. and 1500° C., preferably 1350° C. In one embodiment, the method further includes the step of combining at least two solid oxide fuel cells to form a stack of solid oxide fuel cells. In another embodiment, the channels are formed by placing a fugitive material at the anode or cathode precursor layer. In one embodiment, the fugitive material is removed during heating of the combined anode or cathode precursor layer and electrolyte material. Channels can be formed within the electrodes to facilitate better gas delivery to and removal from the electrodes.

There exist a variety of possible materials that can be used to form the channels or passageways within the cathode and anode layers, such as, for example, fibers. Generally, the only limitations on the selection of materials would be that the material would burn or be out-gassed from the fuel cell during the firing process, and that the material is not reactive with the ceramic particles. These two conditions are adequately satisfied by organic based materials. Thus, the fibers can be natural fibers; cotton, bast fibers, cordage fibers, or animal fibers, such as wool, or they may be manufactured fibers; regenerated cellulose, cellulose diacetate, cellulose triacetate, polyamide, polyester, polyacrylic, polyvinyl, polyolefin resins, carbon or graphite fibers, or liquid crystal polymers. Alternatively, the fibers can be extruded lengths of binder material such as synthetic rubber, thermoplastics, or polyvinyl and extruded lengths of plasticizer material such as glycol and phthalate groups. In another embodiment, the material can be pasta, such as spaghetti. In another embodiment, the fugitive material is removed by dissolving the fugitive material, or by sublimation of the fugitive material. Examples of fugitive materials suitable for removal by dissolution or sublimation include camphene (bicyclic monoterpene) and ice ($H_2O$). In yet another embodiment, the fugitive material is removed by physical removal of the fugitive material. In another embodiment, the channels are formed by laser etching the anode or cathode precursor layer. In yet another embodiment, the channels are formed by cutting, punching, or embossing portions of the anode or cathode precursor layer. The combined anode and cathode precursor layers and electrolyte material can then be heated by hot pressing.

Any suitable anode materials known in the art can be used for the anode, for example, in "High Temperature Solid Oxide Fuel Cells: Fundamentals, Design and Applications," pp. 149-169, Dinghal, et al. Ed., Elsevier Ltd. (2003), the entire teachings of which are incorporated herein by reference. In one embodiment, the anode includes a nickel (Ni) cermet. As used herein, the phrase "Ni cermet" means a ceramic metal composite that includes Ni, such as about 20 wt %-70 wt % of Ni. Examples of Ni cermets are materials that include Ni, lanthanum strontium titanate (LST), and yttria-stabilized zirconia (YSZ), such as $ZrO_2$ containing about 15 wt % of $Y_2O_3$, and materials that include Ni and Y-zirconia or Sc-zirconia. An additional example of an anode material is cerium oxide. A specific example of an Ni cermet includes 67 wt % Ni and 33 wt % YSZ.

Any suitable cathode materials known in the art can be used for the cathode, for example, in "High Temperature Solid Oxide Fuel Cells: Fundamentals, Design and Applications," pp. 119-143, Dinghal, et al. Ed., Elsevier Ltd. (2003), the entire teachings of which are incorporated herein by reference. In one embodiment, the cathode includes a La-manganate (e.g, $La_{1-a}MnO_3$, where "a" is equal to or greater than zero, and equal to or less than 0.1) or La-ferrite based material. Typically, the La-manganate or La-ferrite based material is doped with one or more suitable dopants, such as Sr, Ca, Ba, Mg, Ni, Co or Fe. Examples of doped La-manganate based materials include LaSr-manganates (LSM) (e.g., $La_{1-k}Sr_kMnO_3$, where k is equal to or greater than 0.1, and equal to or less than 0.3, (La+Sr)/Mn is in a range of between about 1.0 and about 0.95 (molar ratio)) and LaCa-manganates (e.g., $La_{1-k}Ca_kMnO_3$, k is equal to or greater than 0.1, and equal to or less than 0.3, (La+Ca)/Mn is in a range of between about 1.0 and about 0.95 (molar ratio)). Examples of doped La-ferrite based materials include LaSrCo-ferrite (LSCF) (e.g. $La_{1-q}Sr_qCo_{1-j}Fe_jO_3$, where each of q and j independently is equal to or greater than 0.1, and equal to or less than 0.4, (La+Sr)/(Fe+Co) is in a range of between about 1.0 and about 0.95 (molar ratio)). In one specific embodiment, cathode 16 includes at least one of a LaSr-manganate (LSM) (e.g., $La_{1-k}Sr_kMnO_3$) and a LaSrCo-ferrite (LSCF). Common examples include $(La_{0.8}Sr_{0.2})_{0.98}MnO_{3\pm\delta}$ ($\delta$ is equal to or greater than zero, and equal to or less than 0.3) and $La_{0.6}Sr_{0.4}Co_{0.2}Fe_{0.8}O_3$.

Typically, the thickness of each of anode and cathode electrodes is, independently, in a range of between about 0.5 mm and about 2 mm. Specifically, the thickness of each of anode and cathode electrodes is, independently, in a range of between about 1 mm and about 2 mm.

A solid electrolyte is located between the anode and the cathode. Any suitable solid electrolytes known in the art can be used in the invention such as those described in "High Temperature Solid Oxide Fuel Cells: Fundamentals, Design and Applications," pp. 83-112, Dinghal, et al. Ed., Elsevier Ltd. (2003), the entire teachings of which are incorporated herein by reference. Examples include YSZ, lanthanum strontium manganate (LSM), $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$). In a specific embodiment, electrolyte 12 includes $ZrO_2$ doped with 8 mol % $Y_2O_3$ (i.e., 8 mol % $Y_2O_3$-doped $ZrO_2$.)

Typically, the thickness of the solid electrolyte is in a range of between about 5 μm and about 20 μm, such as between about 5 μm and about 10 μm. Alternatively, the thickness of the solid electrolyte is thicker than about 100 μm (e.g., between about 100 μm and about 500 μm). In an embodiment employing a solid electrolyte having a thickness greater than about 100 μm, the solid electrolyte can provide structural support for the fuel cell.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:
1. A solid oxide fuel cell, comprising:
    a) an anode layer;
    b) an electrolyte layer over the anode layer; and
    c) a cathode layer over the electrolyte layer, wherein at least one of the anode layer and the cathode layer defines a gas manifold, the gas manifold including,
        i) a gas inlet defined by an edge of the anode layer or cathode layer,
        ii) a gas outlet defined by the same or a different edge of the anode layer or cathode layer, and
        iii) a plurality of gas flow channels in fluid communication with the gas inlet and gas outlet;
    d) wherein the plurality of gas flow channels are formed within the anode layer or cathode layer.
2. The solid oxide fuel cell of claim 1, wherein the gas flow channels have diameters that conduct flow of gas from the gas inlet at substantially equal flow rates among the gas flow channels.

3. The solid oxide fuel cell of claim 1, wherein an inlet channel is defined by the anode layer or the cathode layer, the inlet channel providing fluid communication between the gas inlet and gas flow channels.

4. The solid oxide fuel cell of claim 3, wherein an outlet channel is defined by the anode layer or cathode layer, the outlet channel providing fluid communication between the gas flow channels and the gas outlet.

5. The solid oxide fuel cell of claim 4, wherein the gas flow channels are essentially parallel.

6. The solid oxide fuel cell of claim 5, wherein the fuel cell includes at least two gas inlets.

7. The oxide fuel cell of claim 5, wherein the fuel cell includes at least two gas outlets.

8. The solid oxide fuel cell of claim 7, wherein the fuel cell include two gas outlets, at opposite ends of the outlet channel.

9. The solid oxide fuel cell of claim 4, wherein a major axis of the inlet channel is essentially normal to major axes of the gas flow channels.

10. The solid oxide fuel cell of claim 9, wherein a major axis of the outlet channel is essentially normal to major axes of the gas flow channels.

11. The solid oxide fuel cell of claim 10, wherein the gas inlet is located at one end of the inlet channel.

12. The solid oxide fuel cell of claim 10, wherein the gas inlet is centrally located along the inlet channel.

13. The solid oxide fuel cell of claim 4, wherein the gas flow channels intersect between the inlet channel and the outlet channel.

14. The solid oxide fuel cell of claim 13, wherein at least a portion of the gas flow channels intersect at a substantially normal angle.

15. A method of forming a solid oxide fuel cell, comprising the steps of:

a) forming an anode or green cathode precursor;
b) forming channels in the green anode or cathode precursor layer, the channels defining gas inlet, a gas outlet and a plurality of gas flow channels in fluid communication with the gas inlet and gas outlet;
c) combining the anode or cathode precursor layer with an electrolyte material, whereby the channels are in fluid communication with the electrolyte material; and
d) heating the combined anode or cathode precursor layer and electrolyte materials to form a solid oxide fuel cell.

16. The method of claim 15, further including the step of combining at least two solid oxide fuel cells to form a stack of solid oxide fuel cells.

17. The method of claim 15, wherein the channels are formed by placing a fugitive material at the anode or cathode precursor layer, whereby the fugitive material is removed during heating of the combined anode or cathode precursor layer and electrolyte material.

18. The method of claim 15, wherein the channels are formed by placing a fugitive material at the anode or cathode precursor layer, whereby the fugitive material is removed by dissolving the fugitive material.

19. The method of claim 15, wherein the channels are formed by placing a fugitive material at the anode or cathode precursor layer, whereby the fugitive material is removed by physical removal of the fugitive material.

20. The method of claim 15, wherein the channels are formed by laser etching the anode or cathode precursor layer.

21. The method of claim 15, wherein the channels are formed by cutting or punching of portions of the anode or cathode precursor layer.

22. The method of claim 15, wherein the combined anode or cathode precursor layer is heated by hot pressing.

* * * * *